US012719090B2

(12) United States Patent
Qian et al.

(10) Patent No.: US 12,719,090 B2
(45) Date of Patent: Aug. 25, 2026

(54) LITHIUM ION BATTERY

(71) Applicant: Shenzhen Capchem Technology Co., Ltd., Shenzhen (CN)

(72) Inventors: Yunxian Qian, Shenzhen (CN); Shiguang Hu, Shenzhen (CN); Fangzheng Liu, Shenzhen (CN); Yonghong Deng, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 575 days.

(21) Appl. No.: 18/259,332

(22) PCT Filed: Dec. 16, 2021

(86) PCT No.: PCT/CN2021/138673

§ 371 (c)(1),
(2) Date: Jun. 26, 2023

(87) PCT Pub. No.: WO2022/143189

PCT Pub. Date: Jul. 7, 2022

(65) Prior Publication Data

US 2024/0079652 A1 Mar. 7, 2024

(30) Foreign Application Priority Data

Dec. 29, 2020 (CN) ........................ 202011604680.X

(51) Int. Cl.

| | |
|---|---|
| ***H01M 10/0568*** | (2010.01) |
| ***H01M 4/131*** | (2010.01) |
| ***H01M 4/133*** | (2010.01) |
| ***H01M 4/505*** | (2010.01) |
| ***H01M 4/525*** | (2010.01) |
| ***H01M 4/587*** | (2010.01) |
| ***H01M 10/0525*** | (2010.01) |

(52) U.S. Cl.

CPC ....... *H01M 10/0568* (2013.01); *H01M 4/131* (2013.01); *H01M 4/133* (2013.01); *H01M 4/505* (2013.01); *H01M 4/525* (2013.01); *H01M 4/587* (2013.01); *H01M 10/0525* (2013.01)

(58) Field of Classification Search

None

See application file for complete search history.

(56) References Cited

U.S. PATENT DOCUMENTS

| | | | | |
|---|---|---|---|---|
| 11,469,449 | B1 * | 10/2022 | Ji | H01M 10/0525 |
| 11,961,966 | B2 * | 4/2024 | Xiong | H01M 4/525 |
| 2016/0211553 | A1 * | 7/2016 | Ito | H01M 10/0525 |
| 2017/0373348 | A1 | 12/2017 | Abe et al. | |
| 2018/0277900 | A1 * | 9/2018 | Abe | H01M 4/525 |
| 2019/0089000 | A1 * | 3/2019 | Shi | H01M 10/0525 |
| 2019/0103633 | A1 * | 4/2019 | Shi | H01M 10/0567 |
| 2019/0237804 | A1 * | 8/2019 | Shi | C07D 317/10 |
| 2019/0393556 | A1 * | 12/2019 | Matsuoka | H01M 10/425 |
| 2020/0020972 | A1 * | 1/2020 | Shi | H01M 10/0569 |
| 2022/0123366 | A1 * | 4/2022 | Jiang | H01M 10/0567 |
| 2022/0166009 | A1 * | 5/2022 | Wang | H01M 4/366 |
| 2023/0068610 | A1 * | 3/2023 | Wang | H01M 10/0525 |
| 2024/0304822 | A1 * | 9/2024 | Qian | H01M 4/525 |
| 2024/0313213 | A1 * | 9/2024 | Qian | H01M 4/131 |
| 2026/0005252 | A1 * | 1/2026 | Sum | H01M 4/625 |

FOREIGN PATENT DOCUMENTS

| | | | |
|---|---|---|---|
| CN | 101030659 | A | 9/2007 |
| CN | 105140566 | A | 12/2015 |
| CN | 105580189 | A | 5/2016 |
| CN | 109346772 | A | 2/2019 |
| JP | 2008140683 | A | 6/2008 |
| WO | 2020163879 | A1 | 8/2020 |

OTHER PUBLICATIONS

Search Report for corresponding EP application No. 21913930.0, mailed Dec. 19, 2024 (9 pages).

International Search Report corresponding to PCT Application No. PCT/CN2021/138673, mailed Mar. 1, 2022 (Chinese and English language document) (5 pages).

Office Action for corresponding application CN 202011604680.X, mailed Apr. 17, 2025 (English and Chinese language document) (22 pages).

* cited by examiner

*Primary Examiner* — Kevin M Bernatz

(57) ABSTRACT

In order to overcome the problems in existing lithium ion batteries having high compactness and high-specific-surface-area negative electrodes of serious side reactions of electrolytes and high gas production, the present invention provides a lithium ion battery, comprising a positive electrode, a negative electrode, and a non-aqueous electrolyte. The negative electrode comprises a negative electrode material layer, the compaction density of the negative electrode material layer is greater than or equal to 1.4 g/cm3, and the negative electrode material layer comprises a negative electrode active material, and the non-aqueous electrolyte comprises a solvent, an electrolyte salt, a vinylene carbonate, a fluoroethylene carbonate, and an unsaturated phosphate represented by structural formula 1, and the electrolyte salt comprises LiPF6 and LiFSI. The lithium ion battery provided by the present invention has good cycle performance, high and low temperature storage performance, and lithium precipitation resistance.

10 Claims, No Drawings

LITHIUM ION BATTERY

CROSS-REFERENCE TO RELATED APPLICATIONS

This application is a U.S. national phase application of International Application No. PCT/CN2021/138673, filed on Dec. 16, 2021, which claims priority to Chinese Patent Application No. 202011604680.X, filed on Dec. 29, 2020. The entire disclosure of the above-identified application is incorporated herein by reference.

FIELD

The present disclosure relates to the technology field of secondary battery, and specifically relates to a lithium-ion battery.

BACKGROUND

With the flourishing development of the lithium battery market for power and electric tools, a cylindrical lithium battery, relying on its mature production processes, good consistency and high energy density, occupies a vast market. Leading lithium battery manufacturers such as LG, Panasonic, and Tianpeng have fully occupancy in the field of cylindrical batteries. However, the cylindrical battery also has certain structural flaws, such as the lack of exhaust devices, which easily leads to gas accumulation during the first charge, high-temperature storage, and circulation, causing a high internal pressure that breaks a current interrupt device (CID, an explosion relief valve), thereby making the battery break and unusable. Some existing cylindrical batteries have a higher specific surface area (BET) in the negative electrode, which further exacerbates side reactions between the electrode and the electrolyte, reduces the initial coulombic efficiency, deteriorates the cycling performance, and increases gas generation. Studies have shown that adding an appropriate amount of fluoroethylene carbonate (FEC) to lithium batteries with negative electrodes (or silicon-doped graphite negative electrodes) of higher specific surface area favors forming a stable solid electrolyte interface (SEI) film on surfaces of the negative electrodes to suppress the side reactions, but high FEC containing has two drawbacks: first, for a high coating weight and a high compaction density in positive and negative electrodes, such a thicker interface film will cause serious lithium evolution in the battery; second, a high content of FEC easily participates in oxidation reactions in high-voltage positive electrodes, causing the battery to generate a large amount of gas at high temperatures, affecting the storage performance at the high temperature of the battery.

SUMMARY

For the problems of serious side reactions with an electrolyte and high gas production in existing lithium-ion batteries with negative electrodes of a high compaction density and a high specific surface area, the present disclosure provides a lithium-ion battery.

The technical solutions provided by the present disclosure to solve the above technical problems are as follows.

The embodiment of the present disclosure provides a lithium-ion battery including a positive electrode, a negative electrode, and a non-aqueous electrolyte, wherein the negative electrode includes a negative electrode material layer with a compaction density of ≥1.4 $g/cm^3$, the negative electrode material layer includes a negative electrode active material, the non-aqueous electrolyte includes solvent, an electrolyte salt, vinylene carbonate, fluoro ethylene carbonate and an unsaturated phosphate shown in formula 1, and the electrolyte salt includes $LiPF_6$ and LiFSI, formula 1

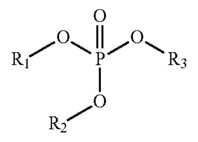

wherein, $R_1$, $R_2$ and $R_3$ are independently selected from a saturated hydrocarbyl, an unsaturated hydrocarbyl or a halogenated hydrocarbyl of $C_1$-$C_5$, and at least one of $R_1$, $R_2$ and $R_3$ is the unsaturated hydrocarbyl;

wherein a specific surface area of the negative electrode active material is A $m^2/g$, and based on a total mass of the non-aqueous electrolyte being 100%, a mass percentage of fluoro ethylene carbonate is B %, a mass percentage of the unsaturated phosphate shown in formula 1 is C %, a mass percentage of LiFSI is D %, wherein X=A/B, Y=B/C and Z=C/D, and X, Y and Z meet the following criteria:

$0.1<X<1$, $10<Y<150$ and $0.01<Z<1$.

In some embodiments, X, Y, and Z meet the following criteria: $0.15<X<0.5$, $15<Y<100$, and $0.03<Z<0.5$.

In some embodiments, the negative electrode further includes a negative electrode current collector, the negative electrode material layer is coated on surfaces at both sides of the negative electrode current collector, and the negative electrode material layer coated on surfaces at both sides has a weight of ≥14 $mg/cm^2$.

In some embodiments, based on the total mass of the non-aqueous electrolyte being 100%, a mass percentage of vinylene carbonate is 0.1-3%, the mass percentage of fluoro ethylene carbonate is 0.1-30%, and the mass percentage of the unsaturated phosphate shown in formula 1 is 0.1-2%.

In some embodiments, based on the total mass of the non-aqueous electrolyte being 100%, the mass percentage of vinylene carbonate is 0.5-1%, the mass percentage of fluoro ethylene carbonate is 0.1-15%, and the mass percentage of the unsaturated phosphate shown in formula 1 is 0.1-1%.

In some embodiments, the electrolyte salt further includes one or more of $LiBF_4$, LiBOB, LiDFOB, LiDFOP, $LiPO_2F_2$, $LiSbF_6$, $LiAsF_6$, $LiN(SO_2CF_3)_2$, $LiN(SO_2C_2F_5)_2$, $LiC(SO_2CF_3)_3$ and $LiN(SO_2F)_2$, and based on the total mass of the non-aqueous electrolyte being 100%, a mass percentage of the electrolyte salt is 0.1-15%.

In some embodiments, based on the total mass of the non-aqueous electrolyte being 100%, the mass percentage of LiFSI is 0.1-12%.

In some embodiments, the negative electrode active material includes one or more of graphite, a silicon-containing material, a mesocarbon microbead and graphene.

In some embodiments, based on the negative electrode active material being graphite, the specific surface area of the negative electrode active material is 0.5-2 $m^2/g$, based on the negative electrode active material being the silicon-containing material, the specific surface area of the negative electrode active material is 2-3 $m^2/g$.

In some embodiments, the solvent includes cyclic carbonate and chain carbonate, wherein the cyclic carbonate includes one or more of propylene carbonate, ethylene carbonate, and butene carbonate;

wherein the chain carbonate includes one or more of dimethyl carbonate, diethyl carbonate, ethyl methyl carbonate and methyl propyl carbonate.

In some embodiments, the non-aqueous electrolyte further includes an auxiliary additive, wherein the auxiliary additive includes one or more of 1,3-propanesultone, 1,4-butanes sultone, ethylene sulfate, methylene methanedisulfonate, tris(trimethylsilyl)phosphate, tris(trimethylsiloxy) borate, propene sultone, fluorobenzene and vinyl ethylenecarbonate, and based on the total mass of the non-aqueous electrolyte being 100%, a mass percentage of the auxiliary additive is 0.1-3%.

In some embodiments, the positive electrode includes a positive electrode material layer, wherein the positive electrode material layer includes a positive electrode active material including one or more of NCM523, NCM622, NCM811 and NCA.

According to the lithium-ion battery provided by embodiments of the present disclosure, for the battery with a negative electrode material layer of a high compaction and a high specific surface area, a combination of vinylene carbonate, fluoro ethylene carbonate, the unsaturated phosphate of formula 1 and LiFSI is added to the electrolyte, which, on the one hand, is conducive to improving the conductivity of the electrolyte, increasing the mobility of Li+, reducing the battery impedance, and improving the rate of charge- and discharge-performance; and on the other hand, forms a dense and stable SEI film on the surface of the negative electrode material layer with the high specific surface area and the high compaction, thus avoiding excessive side reactions between the negative electrode material layer with the high specific surface area and the solvent, thereby inhibiting the gas production in the battery during the formation and cycling process, and improving the cycling performance of the battery.

Further, through a large number of experiments the inventors of the present disclosure found that the content of fluoro ethylene carbonate and the specific surface area of the negative active material are needed to meet a certain proportional relationship, where $0.1<X<1$, thereby improving the storage performance of the battery at high temperatures. If the value of X is too small, the fluoro ethylene carbonate will not be fully consumed, resulting in excessive viscosity of the electrolyte, poor rate at low temperatures and deterioration of storage performance at high temperatures; and if the value of X is too large, FEC will be insufficient to form the SEI film on the negative electrode, resulting in insufficient circulation and storage performance of the battery.

The unsaturated phosphate, fluoro ethylene carbonate, and LiFSI present a good coordination therebetween in embodiments, and limiting the proportional relationship between the values of Y and Z is beneficial to form a protective film on the positive electrode surface, thereby inhibiting the oxidation of fluoro ethylene carbonate on the positive electrode to generate gas, and improving the storage performance at high temperatures.

If the value of Y is too large, it will cause insufficient performance at high temperatures and severe gas expansion; and if the value of Y is too small, it will be easy to cause excessive battery impedance, deterioration of rate charging and discharging performance, and serious lithium evolution in the negative electrode.

If the value of Z is too small, the viscosity of the electrolyte will be too high and it will be easy to corrode aluminum foils of the positive electrode. If the value of Z is too large, the conductivity cannot be promoted to improve Li+ migration, and the battery impedance would be large, resulting in insufficient rate performance at low temperatures.

DETAILED DESCRIPTION

Reference will be made in detail to embodiments of the present disclosure to make the solved technical problems, technical solutions, and beneficial effects of the present disclosure more clear comprehensible. It should be understood that the specific embodiments described herein are only used to generally explain the present disclosure. The embodiments shall not be construed to limit the present disclosure.

The embodiment of the present disclosure provides a lithium-ion battery including a positive electrode, a negative electrode, and a non-aqueous electrolyte, where the negative electrode includes a negative electrode material layer with a compaction density of $\geq 1.4$ g/cm$^3$, the negative electrode material layer includes a negative electrode active material, the non-aqueous electrolyte includes solvent, an electrolyte salt, vinylene carbonate, fluoro ethylene carbonate and an unsaturated phosphate shown in formula 1, and the electrolyte salt includes $LiPF_6$ and LiFSI, formula 1

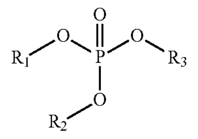

in which $R_1$, $R_2$ and $R_3$ are independently selected from a saturated hydrocarbyl, an unsaturated hydrocarbyl or a halogenated hydrocarbyl of $C_1$-$C_5$, and at least one of $R_1$, $R_2$ and $R_3$ is the unsaturated hydrocarbyl; and a specific surface area of the negative electrode active material is A m$^2$/g, and based on a total mass of the non-aqueous electrolyte being 100%, a mass percentage of fluoro ethylene carbonate in the non-aqueous electrolyte is B %, a mass percentage of the unsaturated phosphate shown in formula 1 in the non-aqueous electrolyte is C %, a mass percentage of LiFSI in the non-aqueous electrolyte is D %, and values of $X=A/B$, $Y=B/C$ and $Z=C/D$, and X, Y and Z meet the following criteria:

$0.1<X<1$, $10<Y<150$ and $0.01<Z<1$.

In the battery with a negative electrode material layer of a high compaction and a high specific surface area, the combination of vinylene carbonate, fluoro ethylene carbonate, the unsaturated phosphate of formula 1 and LiFSI is added to the electrolyte, which, on the one hand, is conducive to improving the conductivity of the electrolyte, increasing the mobility of Li+, reducing the battery impedance, and improving the rate of charge- and discharge-performance; and on the other hand, forms a dense and stable SEI film on the surface of the negative electrode material layer with the high specific surface area and the high compaction, thus avoiding excessive side reactions between the negative electrode material layer with the high specific surface area and the solvent, thereby inhibiting the gas production in the battery during the formation and cycling process, and improving the cycling performance of the battery.

Further, through a large number of experiments the inventors found that the content of fluoro ethylene carbonate and the specific surface area of the negative active material are needed to meet a certain proportional relationship, where $0.1<X<1$, thereby improving the storage performance of the battery at high temperatures. If the value of X is too small, the fluoro ethylene carbonate will not be fully consumed, resulting in excessive viscosity of the electrolyte, poor rate at low temperatures, and deterioration of storage performance at high temperatures; and if the value of X is too large, FEC will be insufficient to form the SEI film on the negative electrode, resulting in insufficient circulation and storage performance of the battery.

The unsaturated phosphate, fluoro ethylene carbonate, and LiFSI present a good coordination therebetween in embodiments, and limiting the proportional relationship between the values of Y and Z is beneficial to form a protective film on the positive electrode surface, thereby inhibiting the oxidation of fluoro ethylene carbonate on the positive electrode to generate gas, and improving the storage performance at high temperatures.

If the value of Y is too large, it will cause insufficient performance at high temperatures and severe gas expansion; and if the value of Y is too small, it will be easy to cause excessive battery impedance, deterioration of rate charging and discharging performance, and serious lithium evolution in the negative electrode.

If the value of Z is too small, the viscosity of the electrolyte will be too high and it will be easy to corrode aluminum foils of the positive electrode. If the value of Z is too large, the conductivity cannot be promoted to improve Li+ migration, and the battery impedance would be large, resulting in insufficient rate performance at low temperatures.

In preferable embodiments, X, Y and Z meet the following criteria: $0.15<X<0.5$, $15<Y<100$ and $0.03<Z<0.5$, with which the lithium-ion battery has good comprehensive performance.

In some embodiments, the lithium-ion battery is a cylindrical lithium-ion battery.

In an embodiment, the negative electrode further includes a negative electrode current collector, the negative electrode material layer is coated on surfaces at both sides of the negative electrode current collector, and the negative electrode material layer coated on surfaces at both sides has a weight of ≥14 mg/cm$^2$.

The non-aqueous electrolyte provided by embodiments of the present disclosure is particularly suitable for the lithium-ion battery with negative electrode material layers of high coating weight, and the non-aqueous electrolyte with said components can effectively suppress the lithium evolution caused by the high coating weight of the negative electrode material layers.

In some embodiments, the negative electrode material layer further includes a negative electrode conductive agent and a negative electrode binder.

In an embodiment, based on a total mass of the non-aqueous electrolyte being 100%, a mass percentage of vinylene carbonate is 0.1-3%, the mass percentage of fluoro ethylene carbonate is 0.1-30%, and the mass percentage of the unsaturated phosphate shown in formula 1 is 0.1-2%, In some embodiments, based on the total mass of the non-aqueous electrolyte being 100%, the mass percentage of vinylene carbonate is 0.5-1%, the mass percentage of fluoro ethylene carbonate is 0.1-15%, and the mass percentage of the unsaturated phosphate shown in formula 1 is 0.1-1%.

Both vinylene carbonate and fluoro ethylene carbonate need to be maintained to certain contents to ensure the improvement of lithium-ion battery performance. If the content of any one of vinylene carbonate and fluoro ethylene carbonate is too low, it is difficult to generate a synergistic effect, for which, an excessive content of vinylene carbonate will lead to an increase in the impedance of the negative electrode and degradation of the rate charging and discharging performance of the battery; and an excessive content of fluoro ethylene carbonate will lead to an excessive viscosity of the non-aqueous electrolyte, degradation of the rate and performance at low temperatures of the battery, and gas accumulation at high temperatures during storage, which will further break the CID in the cylindrical lithium-ion battery.

In some embodiments, based on the total mass of the non-aqueous electrolyte being 100%, the mass percentage of the electrolyte salt is 0.1-15%.

In preferable embodiments, based on the total mass of the non-aqueous electrolyte being 100%, the mass percentage of LiFSI is 0.1-12%.

In some embodiments, the electrolyte salt further includes one or more of $LiBF_4$, LiBOB, LIDFOB, LIDFOP, $LiPO_2F_2$, $LiSbF_6$, $LiAsF_6$, $LIN(SO_2CF_3)_2$, $LIN(SO_2C_2F_5)_2$, $LiC(SO_2CF_3)_3$ and $LIN(SO_2F)_2$.

In preferable embodiments, the electrolyte salt includes $LiPF_6$, LiFSI and $LiPO_2F_2$.

In some embodiments, the unsaturated phosphate shown in formula 1 is selected from one or more of the compounds as shown below.

Compound 1

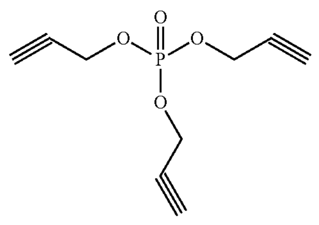

Compound 2

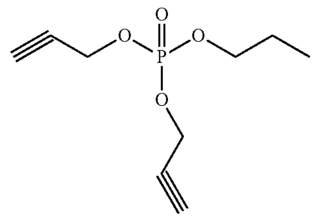

Compound 3

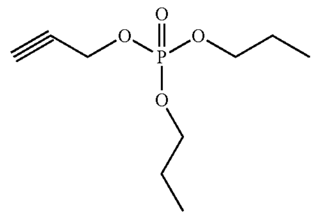

Compound 4

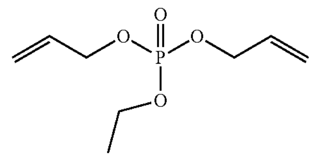

-continued

Compound 5

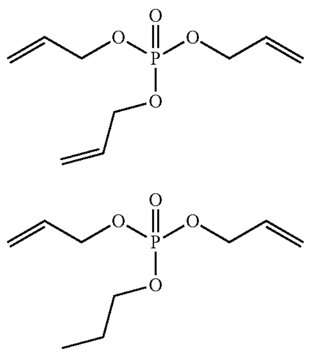

Compound 6

It should be noted that the above compounds are only some preferable compounds of unsaturated phosphate shown in formula 1 and are not intended to limit the present disclosure.

In some embodiments, the negative electrode active material includes one or more of graphite, a silicon-containing material, a mesocarbon microbead and graphene.

The graphite includes one or more of artificial graphite and natural graphite.

The silicon-containing material includes one or more of silicon carbon and silicon oxycarbide.

It should be noted that when the negative electrode active material is selected from different materials, its specific surface area range is different.

In some embodiments, based on the negative electrode active material being the graphite, the specific surface area of the negative electrode active material is 0.5-2 $m^2/g$, and based on the negative electrode active material being the silicon-containing material, the specific surface area of the negative electrode active material is 2-3 $m^2/g$.

In some embodiments, the solvent includes cyclic carbonate and chain carbonate, where the cyclic carbonate includes one or more of propylene carbonate, ethylene carbonate and butene carbonate; and the chain carbonate includes one or more of dimethyl carbonate, diethyl carbonate, ethyl methyl carbonate and methyl propyl carbonate.

In some embodiments, the solvent includes one or more of ethylene carbonate, propylene carbonate, butene carbonate, dimethyl carbonate, diethyl carbonate, ethyl methyl carbonate, methyl propyl carbonate, ethyl acetate and methyl acetate.

In preferable embodiments, the solvent is selected from a mix of ethylene carbonate, dimethyl carbonate and ethyl methyl carbonate.

In some embodiments, the non-aqueous electrolyte further includes an auxiliary additive, where the auxiliary additive includes one or more of 1,3-propanesultone, 1,4-butanes sultone, ethylene sulfate, methylene methanedisulfonate, tris(trimethylsilyl)phosphate, tris(trimethylsiloxy) borate, propene sultone, fluorobenzene and vinyl ethylenecarbonate.

Based on the total mass of the non-aqueous electrolyte being 100%, a mass percentage of the auxiliary additive is 0.1-3%.

In preferable embodiments, the auxiliary additive includes one or more of 1,3-propanesultone, methylene methanedisulfonate and ethylene sulfate.

In some embodiments, the positive electrode includes a positive electrode material layer, which includes a positive electrode active material including one or more of NCM523, NCM622, NCM811 and NCA.

In some embodiments, the positive electrode further includes a positive electrode current collector, and the positive electrode material layer is coated on the surface of the positive electrode current collector.

In some embodiments, the positive electrode material layer further includes a positive electrode conductive agent and a positive electrode binder.

In some embodiments, a working voltage range of the lithium-ion battery is 2.7-4.5V.

In preferable embodiments, the working voltage range of the lithium-ion battery is 3-4.2V The present disclosure will be further described with reference to Examples below.

Example 1

This Example is for describing the lithium-ion battery and its preparation method of the present disclosure, the method includes the following steps:

1.1 Preparation of Non-Aqueous Electrolyte

Ethylene carbonate (EC), ethyl methyl carbonate (EMC) and dimethyl carbonate (DMC) were mixed according to a mass ratio of EC:EMC:DMC=2:1:7, and then added with lithium hexafluorophosphate ($LiPF_6$) to a mass concentration of 12.5%, and then additives with corresponding contents in the following Table were added, in which the amount of the additives was calculated as the percentage of proportion in the total mass of the electrolyte.

| VC (%) | FEC (%) | Compound 1 (%) | LiFSI (%) |
|---|---|---|---|
| 1 | 10 | 0.25 | 2.5 |

1.2 Preparation of Positive Electrode Plate

A positive electrode active material NCM811, conductive carbon black Super-P, and binder polyvinylidene fluoride (PVDF) were mixed in a mass ratio of 93:4:3, and then dispersed in N-methyl-2-pyrrolidone (NMP) to obtain a positive electrode slurry. The slurry was coated evenly on both sides of an aluminum foil, which was dried, rolled and vacuumed, and welded with an aluminum lead wire by an ultrasonic welding machine, to obtain a positive electrode plate with a thickness of 120-150 μm.

1.3 Preparation of Negative Electrode Plate

A negative electrode active material of artificial graphite (BET=1.5 $m^2/g$), conductive carbon black Super-P, binder styrene butadiene rubber (SBR), and carboxymethyl cellulose (CMC) were mixed in a mass ratio of 94:1:2.5:2.5 and then dispersed in deionized water to obtain a negative electrode slurry. The slurry was coated on both sides of a copper foil, which was dried, rolled, and welded with a nickel lead wire by an ultrasonic welding machine, to obtain a negative electrode plate. The negative electrode plate coated on surfaces at both sides presented a weight of 19.8 $mg/cm^2$, and a compaction density of 1.65 $g/cm^3$.

1.4 Preparation of Battery Cell

A polyethylene microporous membrane with a thickness of 20 μm was placed between the positive and negative plates as a diaphragm, and then the sandwich structure composed of the positive plate, the negative plate, and the diaphragm was wound, and then flattened and placed in the aluminum plastic film. After the lead wires of the positive and negative electrodes were led out respectively, the aluminum plastic film was hot pressed and sealed to obtain a battery cell to be injected with liquid.

1.5 Injection of Battery Cells and Formation

In a glove box with a dew point controlled below −40° C., the electrolyte prepared above was injected into the battery cell through an injection hole, ensuring the amount of the electrolyte filling gaps in the battery cell. Then the formation was performed according to the following steps: charging with 0.05 C constant current for 180 minutes, charging with 0.1 C constant current for 180 minutes, shaped and sealed after standing for 24 hours, then further charging to 4.2 V with a constant current of 0.2 C, and discharging to 3.0 V with a constant current of 0.2 C after standing at room temperature for 24 hours.

Examples 2-9

The Examples 2-9 are for describing the lithium-ion battery and its preparation method in the present disclosure, which include most of the steps in Example 1, with the following differences.

In the preparation of the non-aqueous electrolyte, based on the total mass of the non-aqueous electrolyte being 100%, the non-aqueous electrolyte was added with the components with the mass percentage as shown in Examples 2-9 in Table 1.

In the preparation of the negative electrode plate, preparations were performed according to the coating weight, compaction density, and specific surface area of the negative electrode active material shown in Examples 2-9 of Table 1.

Comparative Examples 1-9

Comparative Examples 1 to 9 were used to compare and describe the lithium-ion battery and its preparation method in the present disclosure, which include most of the steps in Example 1, with the differences as follows.

In the preparation of the non-aqueous electrolyte, based on the total mass of the non-aqueous electrolyte being 10000, the non-aqueous electrolyte was added with the components with the mass percentage shown in Comparative Examples 1-9 in Table 1.

In the preparation of the negative electrode plate, preparations were performed according to the coating weight, compaction density, and specific surface area of the negative electrode active material shown in Comparative Examples 1-9 in Table 1.

TABLE 1

| Group | Coating weight in negative electrode ($mg/cm^2$) | Compaction density, in negative electrode ($g/cm^3$) | Specific surface area ($m^2/g$) | FEC Content (%) | VC content (%) | Content of the unsaturated phosphate shown in formula 1 (%) | $LiPF_6$ content (%) | LiFSI content (%) | X | Y | Z |
|---|---|---|---|---|---|---|---|---|---|---|---|
| Example 1 | 19.8 | 1.65 | 1.5 | 10 | 1 | Compound 1: 0.25 | 12.5 | 2.5 | 0.15 | 40 | 0.1 |
| Example 2 | 19.8 | 1.65 | 3 | 20 | 1 | Compound 1: 0.5 | 10 | 5 | 0.15 | 40 | 0.1 |
| Example 3 | 19.8 | 1.65 | 1.5 | 10 | 1 | Compound 1: 0.2 | 13 | 2 | 0.15 | 50 | 0.1 |
| Example 4 | 19.8 | 1.65 | 1.5 | 10 | 1 | Compound 1: 0.2 | 10 | 5 | 0.15 | 50 | 0.04 |
| Example 5 | 19.8 | 1.65 | 2 | 10 | 1 | Compound 1: 0.25 | 12.5 | 2.5 | 0.2 | 40 | 0.1 |
| Example 6 | 19.8 | 1.65 | 3 | 10 | 1 | Compound 1: 0.25 | 14.375 | 0.625 | 0.3 | 40 | 0.4 |
| Example 7 | 19.8 | 1.65 | 3 | 10 | 1 | Compound 1: 0.25 | 12.5 | 2.5 | 0.3 | 40 | 0.1 |
| Example 8 | 19.8 | 1.65 | 3 | 3.5 | 1 | Compound 1: 0.25 | 12.5 | 2.5 | 0.857 | 14 | 0.1 |
| Example 9 | 19.8 | 1.65 | 3 | 10 | 1 | Compound 1: 0.5 | 14.0 | 1.0 | 0.3 | 20 | 0.5 |
| Comparative Example 1 | 19.8 | 1.65 | 1.5 | 20 | 1 | Compound 1: 0.5 | 10 | 5 | 0.075 | 40 | 0.1 |
| Comparative Example 2 | 19.8 | 1.65 | 1.5 | 1 | 1 | Compound 1: 0.025 | 14.75 | 0.25 | 1.5 | 40 | 0.1 |
| Comparative Example 3 | 19.8 | 1.65 | 3 | 30 | 1 | Compound 1: 0.75 | 7.5 | 7.5 | 0.1 | 40 | 0.1 |
| Comparative Example 4 | 19.8 | 1.65 | 3 | 2 | 1 | Compound 1: 0.05 | 14.5 | 0.5 | 1.5 | 40 | 0.1 |
| Comparative Example 5 | 19.8 | 1.65 | 1.5 | 10 | 1 | Compound 1: 0.05 | 14.5 | 0.5 | 0.15 | 200 | 0.1 |
| Comparative Example 6 | 19.8 | 1.65 | 1.5 | 10 | 1 | Compound 1: 1 | 5 | 10 | 0.15 | 10 | 0.1 |
| Comparative Example 7 | 19.8 | 1.65 | 1.5 | 10 | 1 | Compound 1: 0.2 | 14.8 | 0.2 | 0.15 | 50 | 1 |
| Comparative Example 8 | 19.8 | 1.65 | 1.5 | 10 | 1 | Compound 1: 0.15 | 0 | 15 | 0.15 | 66.7 | 0.01 |
| Comparative Example 9 | 19.8 | 1.65 | 1.5 | 10 | 0 | Compound 1: 0.25 | 12.5 | 2.5 | 0.15 | 40 | 0.1 |

Performance Test

Following performance tests were individually performed on the lithium-ion batteries prepared in the above Examples 1-9 and comparative Examples 1-9.

1. Cycling Performance Test

The lithium-ion battery was charged to 4.2 V at a constant current of 1 C at 25° C., and then was charged at a constant voltage until the current dropped to 0.1 C, followed by discharging to 3.0 V at a constant current of 1 C. These processes were repeated for 1,000 cycles, and the discharge capacity of the first cycle and the discharge capacity of the 1,000th cycle were recorded, to calculate the capacity retention rate as follows:

Capacity retention rate is equal to (discharge capacity in the 1,000th cycle/discharge capacity in the first cycle)× 100%.

ii. Direct Current Internal Resistance (DCIR) Performance Test at Room Temperature The formed battery was charged to 50% of state of charge (SOC) with 1C at 25° C., and charged and discharged with 0.1 C, 0.2 C, 0.5 C, 1 C and 2 C for ten seconds then individually, to record the charge and discharge cutoff voltages respectively. Then, by taking the charging and discharging currents of different rates as the abscissa (unit: A), and the cutoff voltages corresponding to the charging and discharging currents as the ordinate (unit: mV), a linear relationship graph was made.

DCIR value of discharge is equal to the slope value of the linear relationship graph made by different discharge currents and their corresponding cutoff voltages.

iii. Storage Test of 4.2V Fully Charged State at 60° C.

The battery after capacity grading was charged to 4.2 V with 0.5 C at room temperature, and the cut-off current was 0.02 C. After placed for 5 minutes, the battery was discharged to 3.0V with 0.5 C for recording an initial capacity D1, and then was charged to 4.2 V with a constant current and voltage of 0.5 C, with the cut-off current of 0.02 C. After the battery in the fully charged state was stored in an incubator at 60° C. for 7 days, it was placed at room temperature for 4 hours, followed by discharging to 3.0 V with 0.5 C, for recording a retention capacity D2.

Battery capacity retention rate (%) is equal to D2/D1× 100%.

iv. Discharge Capacity Test at −20° C.

The battery was charged with a constant current and voltage of 0.5 C at room temperature (25° C.), and a cut-off voltage was set as 4.2 V and a cut-off current was set as 0.05 C. After fully charged, the battery was placed in a high and low temperature incubator at −20° C. for 4 hours, then discharged at a constant current of 0.5 C with a cut-off voltage of 2.8V, for recording the discharge capacity after discharge, which is compared with the discharge capacity with 0.5 C at room temperature.

Capacity retention rate is equal to (capacity Q at −20° C./capacity Q2 at 25° C.)×100% v. Corrosion Detection of Aluminum Foil

The battery with forming and capacity grading was disassembled in the glove box to observe corrosions of the positive electrode interface and current collector corrosion, and if the positive electrode stock falls or the aluminum foil turns black, it indicates that the aluminum foil is corroded by LiFSI.

vi. Interface Detection after Capacity Grading

The battery with forming and capacity grading was disassembled in the glove box to observe the state and color of the negative electrode interface. If the interface has a pure golden and smooth surface, there is no lithium evolution. If there are silver-white stripes on the golden surface, it indicates that the negative electrode impedance is too high, leading to lithium evolution.

The obtained test results are shown in Table 2.

TABLE 2

| | Capacity retention rate of the 1,000th cycle in cycling at 25° C. with 0.5 C./1 C. | DCIR/mΩ | Capacity retention rate stored after 7 days at 60° C. | Capacity retention rate of discharge at low temperature of −20 ° C. | Corrosion detection of aluminum foil | Interface detection after capacity grading |
|---|---|---|---|---|---|---|
| Example 1 | 89.40% | 32.4 | 95.10% | 78.30% | No corrosion | No lithium evolution |
| Example 2 | 90.20% | 33.50 | 96.40% | 78.50% | No corrosion | No lithium evolution |
| Example 3 | 90.30% | 31.40 | 94.20% | 80.60% | No corrosion | No lithium evolution |
| Example 4 | 91.30% | 30.40 | 94.5% | 82.60% | No corrosion | No lithium evolution |
| Example 5 | 89.30% | 31.7 | 96.2% | 79.20% | No corrosion | No lithium evolution |
| Example 6 | 88.90% | 30.40 | 96.5% | 78.20% | No corrosion | No lithium evolution |
| Example 7 | 89.2% | 30.1 | 97.8% | 80.60% | No corrosion | No lithium evolution |
| Example 8 | 70.2% | 30.2 | 96.20% | 81.10% | No corrosion | No lithium evolution |
| Example 9 | 90.20% | 34.6 | 97.20% | 75.50% | No corrosion | No lithium evolution |
| Comparative Example 1 | 85.40% | 42.2 | 83% | 40% | No corrosion | Slight lithium evolution |
| Comparative Example 2 | 60.40% | 29.4 | 86.30% | 75.20% | No corrosion | No lithium evolution |
| Comparative Example 3 | 79.40% | 48.5 | 80% | 20% | No corrosion | Medium lithium evolution |
| Comparative Example 4 | 56.40% | 30 | 83.2% | 73.30% | No corrosion | No lithium evolution |
| Comparative Example 5 | 77.50% | 37.2 | 64.30% | 75.60% | No corrosion | No lithium evolution |
| Comparative Example 6 | 80.30% | 45.3 | 92.30% | 24.50% | No corrosion | Serious lithium evolution |
| Comparative Example 7 | 85.50% | 40.2 | 90.40% | 54.30% | No corrosion | Slight lithium evolution |
| Comparative Example 8 | — | — | — | — | Serious corrosion | No lithium evolution |
| Comparative Example 9 | 80.4% | 32.2 | 75.10% | 80.30% | No corrosion | No lithium evolution |

From the test data of the Comparative Examples 1-4 and Examples 1 and 2, it could be seen that under the condition of fixed Y and Z values, if X≥1, FEC was not sufficient to passivate the negative electrode with high specific surface area, and the formed SEI was not dense and stable enough, presenting a poor cycling performance; if X≤0.1, excessive FEC results in high electrolyte viscosity, deteriorations of DCIR and low-temperature discharge, and severe degradation of high-temperature storage performance; and if 0.1<X<1, the battery had good cycling performance and good performances at low and high temperatures.

Through the test results of Comparative Example 5, Comparative Example 6, and Example 3, it can be found that when the negative electrode BET=1.5 $m^2/g$, under the condition of fixed X and Z values, if Y≥150, where BET=1.5 $m^2/g$, FEC=10%, and the unsaturated phosphate shown in formula 1=0.05%, the positive electrode is insufficiently protected, the electrolyte was oxidized severely, and the high-temperature storage performance was poor; if Y<10, where BET=1.5 $m^2/g$, FEC=10%, and the unsaturated phosphate as shown in formula 1=1%, excessive films were formed in the positive and negative electrodes, with an excessive interface impedance, serious deteriorations of DCIR and the low-temperature performance, leading to serious lithium evolution at the negative electrode interface; if 10<Y<150, where BET=1.5 $m^2/g$, FEC=10%, and the unsaturated phosphate shown in formula 1=0.2%, the battery presented good cycling performance and good performances at low and high temperatures.

Through the test results of Comparative Example 7, Comparative Example 8, and Example 4, it could be found that when the negative BET is 1.5 $m^2/g$, under the condition of fixed X and Y values, if Z≥1, where BET=1.5 $m^2/g$, FEC=10%, the unsaturated phosphate shown in formula 1=0.2%, and LiFSI≤0.2%, LiFSI was insufficient and the SEI interface was mainly composed of organic products of FEC and the unsaturated phosphate shown in formula 1, which had poor lithium conductivity, high impedance and easy lithium evolution after charging and discharging; if Z≤0.01, where BET=1.5 $m^2/g$, FEC=10%, the unsaturated phosphate shown in formula 1=0.15% and LiFSI≥15%, the aluminum foil underwent severe corrosion and the battery failed; and if 0.01<Z<1, where BET=1.5 $m^2/g$, FEC=10%, the unsaturated phosphate shown in formula 1=0.2%, 0.2%<LiFSI<15%, the battery had good cycling performance and good performances at low and high temperatures, and did not corrode the aluminum foil.

Through the test results of Comparative Example 9 and Example 1, it could be found that in embodiments of the present disclosure, vinylene carbonate was a necessary additive for improving the battery's comprehensive performance. When vinylene carbonate was not added to the non-aqueous electrolyte, the cycling performance and high-temperature storage performance of the battery were relatively reduced.

Comparing the test results of Examples 1-9, it can be found that when 0.1<X<1, 10<Y<150, and 0.01<Z<1, the lithium-ion battery had good comprehensive performance, especially when 0.15<X<0.5, 15<Y<100, and 0.03<Z<0.5, the lithium-ion battery had excellent comprehensive performance.

The above embodiments are only preferred embodiments of the present invention and are not construed to limit the present disclosure. Any modifications, equivalent substitutions, and improvements can be made within the spirit and principles of the present disclosure shall be included in the scope of the present invention.

What is claimed is:

1. A lithium-ion battery, comprising a positive electrode, a negative electrode and a non-aqueous electrolyte, wherein the negative electrode comprises a negative electrode material layer with a compaction density of ≥1.4 $g/cm^3$, the negative electrode material layer comprises a negative electrode active material, the non-aqueous electrolyte comprises solvent, an electrolyte salt, vinylene carbonate, fluoro ethylene carbonate and an unsaturated phosphate shown in formula 1, and the electrolyte salt comprises $LiPF_6$ and LiFSI, formula 1

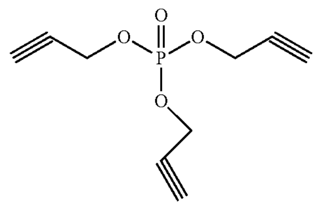

wherein a specific surface area of the negative electrode active material is A $m^2/g$, and based on a total mass of the non-aqueous electrolyte being 100%, a mass percentage of fluoro ethylene carbonate is B %, a mass percentage of the unsaturated phosphate shown in formula 1 is C %, a mass percentage of LiFSI is D %, wherein X=A/B, Y=B/C and Z=C/D, and X, Y and Z meet the following criteria: 0.15<X<0.5, 15<Y<100 and 0.03<Z<0.50, a mass percentage of vinylene carbonate is 0.1-3%, the mass percentage of fluoro ethylene carbonate is 0.1-30%, and the mass percentage of the unsaturated phosphate shown in formula 1 is 0.1-2%, and the mass percentage of LiFSI is 0.1-12%.

2. The lithium-ion battery according to claim 1, wherein the negative electrode further comprises a negative electrode current collector, the negative electrode material layer is coated on surfaces at both sides of the negative electrode current collector, and the negative electrode material layer coated on surfaces at both sides has a weight of ≥14 $mg/cm^2$.

3. The lithium-ion battery according to claim 1, wherein the electrolyte salt further comprises one or more of $LiBF_4$, LiBOB, LiDFOB, LiDFOP, $LiPO_2F_2$, $LiSbF_6$, $LiAsF_6$, $LIN(SO_2CF_3)_2$, $LiN(SO_2C_2F_5)_2$, $LiC(SO_2CF_3)_3$ and $LiN(SO_2F)_2$, wherein based on the total mass of the non-aqueous electrolyte being 100%, a mass percentage of the electrolyte salt is 0.1-15%.

4. The lithium-ion battery according to claim 1, wherein the negative electrode active material comprises one or more of graphite, a silicon-containing material, a mesocarbon microbead and graphene.

5. The lithium-ion battery according to claim 1, wherein based on the negative electrode active material being graphite, the specific surface area of the negative electrode active material is 0.5-2 $m^2/g$, based on the negative electrode active material being the silicon-containing material, the specific surface area of the negative electrode active material is 2-3 $m^2/g$.

6. The lithium-ion battery according to claim 1, wherein the solvent comprises cyclic carbonate and chain carbonate, wherein the cyclic carbonate comprises one or more of propylene carbonate, ethylene carbonate and butene carbonate;

wherein the chain carbonate comprises one or more of dimethyl carbonate, diethyl carbonate, ethyl methyl carbonate and methyl propyl carbonate.

7. The lithium-ion battery according to claim 1, wherein the non-aqueous electrolyte further comprises an auxiliary additive, wherein the auxiliary additive comprises one or more of 1,3-propanesultone, 1,4-butanes sultone, ethylene sulfate, methylene methanedisulfonate, tris(trimethylsilyl) phosphate, tris(trimethylsiloxy) borate, propene sultone, fluorobenzene and vinyl ethylenecarbonate.

8. The lithium-ion battery according to claim 7, wherein based on the total mass of the non-aqueous electrolyte being 100%, a mass percentage of the auxiliary additive is 0.1-3%.

9. The lithium-ion battery according to claim 1, wherein the positive electrode comprises a positive electrode material layer, wherein the positive electrode material layer comprises a positive electrode active material comprising one or more of NCM523, NCM622, NCM811 and NCA.

10. The lithium-ion battery according to claim 1, wherein based on the total mass of the non-aqueous electrolyte being 100%, a mass percentage of vinylene carbonate is 0.5-1%, the mass percentage of fluoro ethylene carbonate is 0.1-15%, and the mass percentage of the unsaturated phosphate shown in formula 1 is 0.1-1%.

* * * * *